Nov. 6, 1923.　　　　E. G. GUNN　　　　1,473,093
MOTOR VEHICLE
Filed Aug. 28, 1920　　2 Sheets-Sheet 1
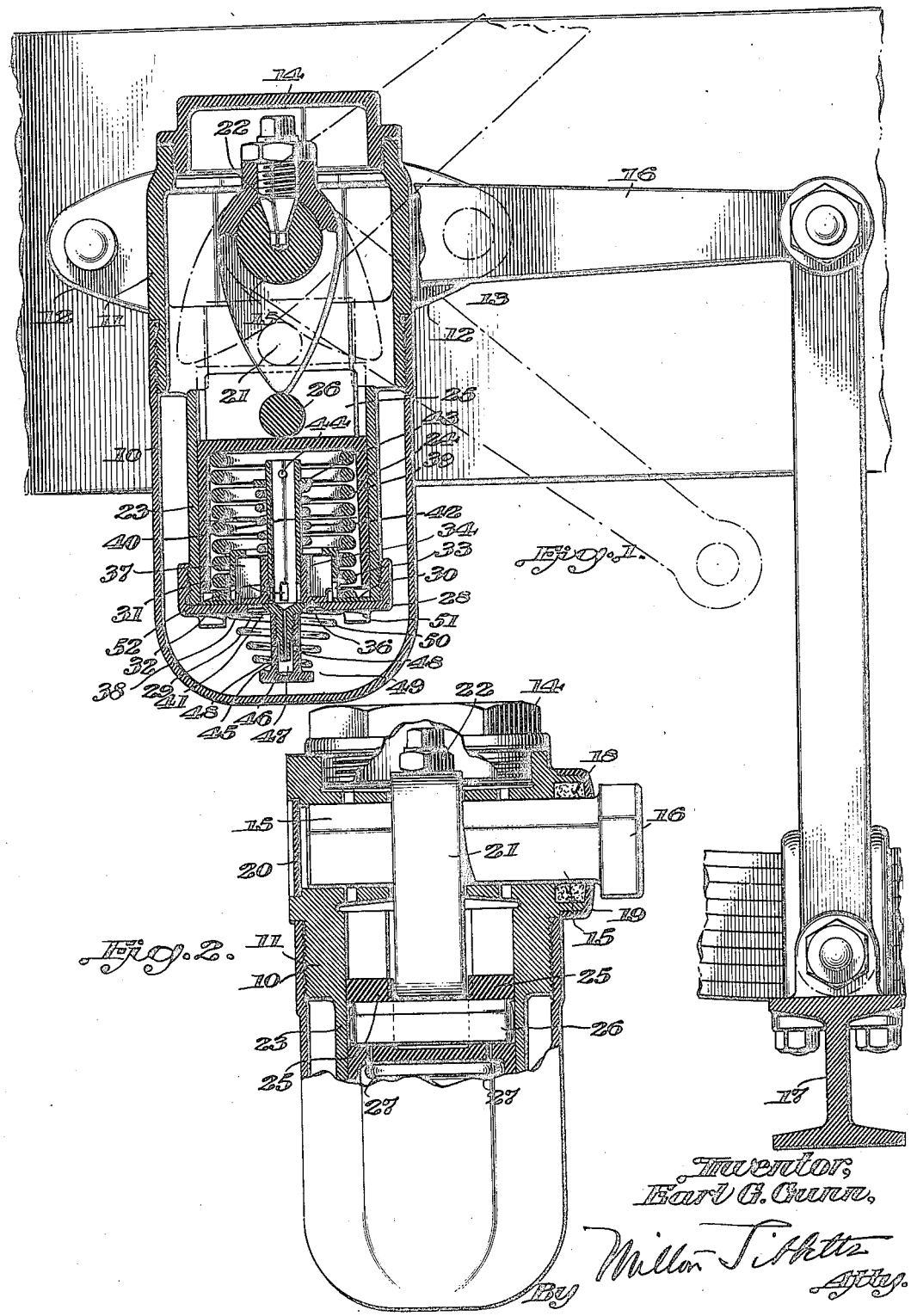

Nov. 6, 1923. 1,473,093
E. G. GUNN
MOTOR VEHICLE
Filed Aug. 28, 1920 2 Sheets-Sheet 2
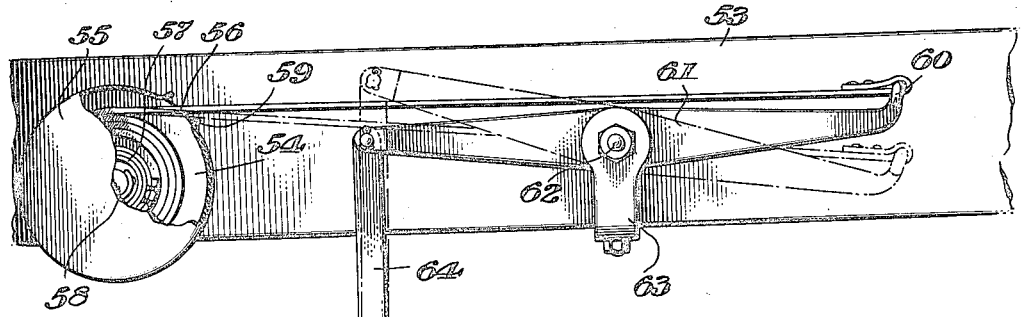
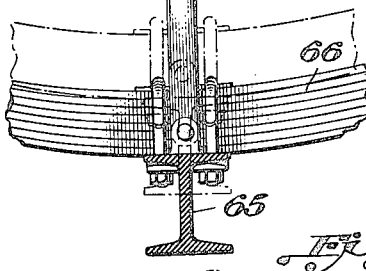
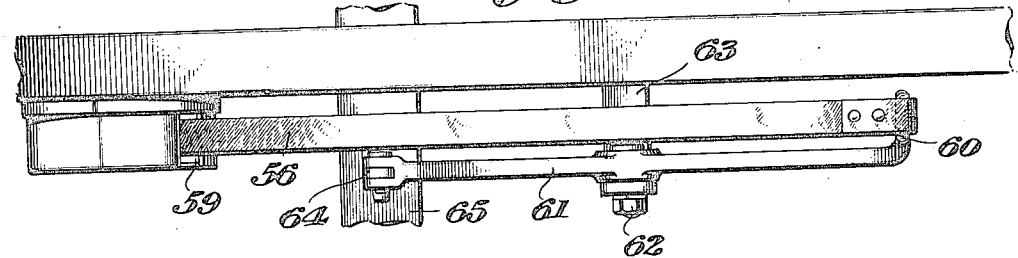
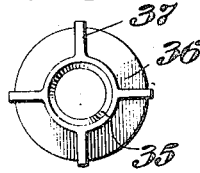
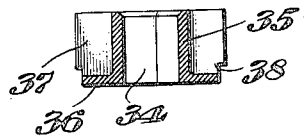
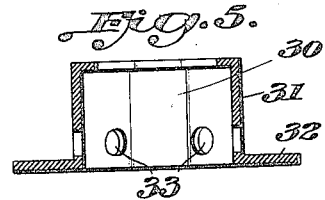

Patented Nov. 6, 1923.

1,473,093

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 26, 1920. Serial No. 406,682.

*To all whom it may concern:*

Be it known that I, EARL G. GUNN, a citizen of the United States, and resident of Detroit, Wayne County, State of Michigan, have invented certain new and useful Improvements in Motor Vehicles, of which the following is a specification.

This invention relates to motor vehicles and more particularly, to shock absorbers for such vehicles.

Various types of shock absorbers are now on the market and practically all these devices operate in a manner to retard the relative movement of the vehicle frame and axle. Some of these devices retard the relative movement of one of the elements, such as the axle, with respect to the other element, or frame, in either direction away from the normal or initial position of the axle. Others retard the movement of the axle with respect to the frame in one direction only, or dissipate the shock by retarding the return movement or rebound of the axle.

It has been found, however, by experimenting that the most effective device of this character is one that will permit substantially free movement of the frame or axle away from the initial or intermediate position in either direction, but will retard the return movement from either extreme position to the initial or normal position.

One of the objects of the invention, therefore, is to provide a shock absorber that will permit substantially free movement of the axle or frame away from its initial position but will dissipate or absorb the shock of the return movement from either extreme position to the intermediate or initial position.

Another object of the invention is to provide a shock absorber that will be compact in construction and can readily be applied to and is adaptable for various sizes and kinds of vehicles.

Further objects of the invention will appear from the following specification taken in connection with the drawings which form a part of this application, and in which:

Fig. 1 is a vertical sectional view illustrating a shock absorber constructed in accordance with my invention;

Fig. 2 is a view taken at right angles to Fig. 1 showing certain parts broken away and certain parts in section;

Fig. 3 is a detail plan view illustrating the intake valve;

Fig. 4 is a detail sectional view of the intake valve shown in Fig. 3;

Fig. 5 is an enlarged detail view of the valve guiding member;

Fig. 6 illustrates in side elevation another form of shock absorber constructed in accordance with my invention; and Fig. 7 is a top plan view of the construction shown in Fig. 6.

The embodiment of the invention illustrated in Figs. 1 to 5 inclusive will first be described, and this construction comprises briefly a casing adapted to be secured to the vehicle frame and having a cylinder formed on or secured thereto, said casing having also mounted therein means, such as a rock shaft, adapted to be secured to the vehicle axle. The device illustrated particularly in Figs. 1 and 2 belongs to that class of shock absorbers known as the hydraulic type, the casing being filled with some fluid such as oil. A piston is mounted in the cylinder and is normally retained in a position at the bottom of the cylinder by means such as a cam, this cam being carried by a rock shaft and the rock shaft being operatively connected to the vehicle axle, as above stated. When the vehicle frame or axle is displaced from its normal intermediate position, the piston is permitted to rise under the influence of a spring and the fluid enters the cylinder through an intake opening formed therein. The return movement of the axle or frame, however, forces the piston downwardly and forces the fluid out of the cylinder through restricted openings, thereby gradually dissipating the shock.

Referring now to the drawings and particularly to Figs. 1 and 2, I have shown a casing which in this instance is made in two sections, 10 and 11, one of the sections being screw-threaded to the other. The section 11 has formed thereon or secured thereto outwardly extending lugs 12, by means of which it is secured to the frame 13 of the motor vehicle. This section is closed at its upper end by means of a cap 14. A rock shaft 15 is rotatably mounted in the walls of the casing and one end of the rock shaft extends through the casing and has secured thereto an arm 16 which is adapted to be connected to an axle 17 of the vehicle. A packing member 18 surrounds the end of the rock shaft above mentioned and prevents the escape of oil enclosed within the casing, a ring 19 surrounding the packing.

The opposite end of the rock shaft is spaced from the outer surface of the casing and the opening in the casing is closed by means of a disk 20.

Intermediate its ends, the rock shaft 15 has secured thereto a cam 21, the cam being secured to the rock shaft by a stud 22 which is threaded into the cam and extends into the rock shaft.

A cylinder 23 is formed on or secured to section 11 of the casing and extends downwardly into section 10 and has a piston 24 slidably mounted therein. The piston 24 has formed thereon upwardly extending lugs 25 in which is mounted a pin or roller 26. As shown in Fig. 1, the piston is hollow and its upper wall has a pair of openings 27 leading from the interior of the piston to the bearing surface for the pin 26 and permitting a limited amount of oil to pass therethrough to the bearing surface. The pin 26 is engaged by the cam 21 carried by the rock shaft 15, the piston being retained in its lowest position in the cylinder when the arm 16 is disposed in its intermediate or horizontal position.

The cam 21 and pin 26 are so constructed and arranged that a slight movement in either direction of the arm 16, and consequently of the rock shaft and cam, will permit very little movement of the piston in the cylinder, and therefore, there is substantially no retarding of the return movement of the arm in either direction.

The lower end of the cylinder 23 has threaded thereon a cap 28 having an opening 29 therein which constitutes an inlet opening or port for the cylinder. The cap 28 has seated thereon on its inner surface a valve guiding member 30 illustrated in detail in Fig. 5, this member having a cylindrical portion 31 and a flat portion or flange 32 extending outwardly from the portion 31. The cylindrical wall 31 has a plurality of radial openings 33 through which the oil may pass into the interior of the piston. An intake valve 34 is slidably mounted in the valve guiding member 30, this valve having also a cylindrical portion 35, a flange portion 36 and radially extending webs 37, the webs engaging the inner walls of the cylindrical portion 31 of the valve guiding member 30. As illustrated in detail in Fig. 4, the web portions 37 of the intake valve are notched on their lower outer corners, as shown at 38, these notches cooperating with the openings 33 in the valve guiding member in permitting the passage of oil through these openings.

A coil compression spring 39 is seated at its lower end on the valve guiding member 30 and at its upper end engages the upper wall of the piston, this spring constantly tending to force the piston upwardly and being prevented from so doing when the axle and frame are in their initial or normal positions by means of the cam 21, which, as above stated, engages the pin 26 carried by the piston.

The intake valve 34 is normally seated on the intake port 29 in the following manner: A hollow spindle 40 is slidably mounted in the inner wall of the cylindrical portion 35 of the intake valve, this spindle having means hereinafter described for permitting the gradual egress of the fluid or oil from the interior of the piston and cylinder, and also being provided with means constituting a relief valve for relieving the pressure caused by excessive shocks or strains. The opening formed in the inner wall of the cylindrical portion 35 of the valve 34 constitutes an outlet port for the fluid, and this port is normally closed by means of an outwardly extending flange 41 formed on the hollow spindle 40, this flange constituting the valve for closing the port. A coil compression spring 42 engages at its lower end the upper surface of the cylindrical wall 35 of the valve 34, and at its upper end a washer 43 which surrounds the spindle 40 and is retained in place by means of a cotter pin 44 carried by the spindle. The gradual egress of the fluid is permitted by means of a downwardly extending restricted opening 45 formed in the lower end of the spindle 40, this lower end being reduced in section and solid in cross section except for the opening 45. A cap 46 is screwthreaded to the lower end of the spindle and has a chamber 47 formed therein and disposed below the spindle 40. Openings 48 are formed in the wall of the cap and permit the passage of oil from the chamber 47 into the casing 10. The cap 46 has also formed thereon an outwardly extending flange 49 and a spring 50 is interposed between the flange 49 and the lower surface of the cap 28 carried by the cylinder 23, lugs 51 being formed on the cap and retaining the spring in position.

From the above description it will be seen that the oil which passes into the interior of the piston 24 may pass freely into the upper end of the hollow spindle 40, and from this spindle is gradually forced out through restricted openings 45 and 48 by the return of the piston to its normal position under the action of the cam 21. However, in order to relieve the pressure when the device is placed under excessive strain, the hollow portion of the spindle 40 is provided adjacent the relief valve 41 with a plurality of elongated radial openings 52, these openings being disposed just above the relief valve and being uncovered as the spindle 40 is forced downwardly against the action of the spring 42 by the rapid descent of the piston.

The embodiment of the invention just described operates in the following manner: Assuming that the device is used on a motor vehicle and that the section 11 of the casing is secured to one part of the vehicle, as the frame, and that the arm 16 is secured to the vehicle axle, it will be understood that the full line position of these elements shown in Fig. 1 represents the normal position of the frame and axle and of the shock absorber. When the vehicle is traveling over an uneven road surface, there will, of course, be relative movement between the axle and frame and therefore between the elements of the shock absorber which are secured to these vehicle parts. This relative movement will cause the arm 16 to move upwardly or downwardly, and as this arm moves from its initial position, the cam 21 will also be displaced from its initial, intermediate, or full line position to one of the positions shown in dotted lines in Fig. 1. This movement of the cam will release the piston 24, thereby permitting this member to move upwardly under the action of the spring 39. It should be noted that the initial relative movement of the frame and axle from their normal positions is not resisted but that these elements may move freely to their extreme positions. However, the rebound or return movement of the frame and axle will be opposed by the engagement of the cam 21 with the pin 26 carried by the piston. The upward movement of the piston above described will open the intake valve 34 due to the suction created by the movement of the piston, it being understood that the spring 50 is of such strength that this suction overcomes the tension of the spring. The opening of the intake valve permits the oil or fluid in the casing to flow through the port 29 into the interior of the piston and cylinder, a portion of the oil flowing through the openings 33 formed in the intake valve guiding member 31. When the piston is forced downwardly by the return movement of the vehicle frame and axle, the oil which has been drawn into the piston and cylinder must necessarily be forced outwardly. This outward flow of the oil is permitted by the restricted openings 45 and 48, it being understood that the oil flows downwardly through the hollow portion of the spindle 40. The gradual egress of the oil will dissipate the shock on the return movement of the frame and axle to their initial positions. Under excessive or severe shocks, however, it has been found that the restricted openings do not permit the oil to pass as rapidly from the interior of the piston and cylinder as is desirable or necessary, and in order to relieve this pressure, the hollow spindle is permitted to move longitudinally under the pressure of the oil, forcing the relief valve 41 from its seat and permitting the oil to pass through the openings 52 which are uncovered by the downward movement of the spindle 40.

As above stated in the specification, the objects of the invention are also attained by the embodiment of the invention shown in Figs. 6 and 7. Referring now to these figures, I have shown therein a frame member 53 of a motor vehicle, this member having mounted thereon a shock absorber retarding member 54, which in this instance consists of a snubber. Any of the common forms of snubbers may be utilized, and the one illustrated includes a casing 55 which is secured to the frame 53 of the vehicle and encloses a strap 56 which is connected to a spring 57 in any suitable manner, this spring being normally under compression and being adapted to take up any slack in the strap 56 due to the relative movement of the frame or axle of the vehicle. The inner end of the spring is secured to a spindle 58 carried by the casing 55. The free end of the strap 56 is drawn outwardly through an opening 59 in the casing 55 and is secured to one end 60 of a lever 61 pivoted at 62 to a bracket 63 carried by the frame member 53 of the vehicle, the end 60 of the lever being offset, as clearly illustrated in Fig. 7. The opposite end of the lever 61 is connected by a link 64 to an axle 65 of the vehicle, it being understood that the axle and frame are connected by the usual vehicle springs 66.

The construction shown in Figs. 6 and 7 operates as follows: When the axle and frame are in their intermediate or normal positions with respect to each other, the lever 61 is disposed substantially horizontally, as shown in Fig. 6. When, however, the axle moves away from its normal position in either direction, the lever 61 is swung on its pivot 62 and the movement of this lever in either direction will cause a slack in the strap 56, which is immediately taken up by the spring 57 in the snubber. The return movement of the axle in either direction will therefore be opposed by the snubber and the shock of the rebound will be dissipated.

Although certain specific embodiments of the invention have been illustrated and described, it will be understood that the invention is capable of further modification and that changes in the construction and arrangement of the various cooperating parts may be made without departing from the spirit or scope of the invention as expressed in the following claims.

Having described my invention, what I claim and desire to secure by Letters Patent is:—

1. A shock absorber comprising a member adapted to be secured to one of two relatively movable elements, a member adapted to be secured to the other of said elements, and resiliently controlled means carried by the first named member and adapted to resist only the return movement of said elements from their extreme positions to their initial positions.

2. A shock absorber comprising a casing, a cylinder disposed in said casing, a piston in said cylinder, said cylinder having a port adapted to admit fluid to said cylinder, a valve seating on said port, means for seating said valve, and a second valve carried by said first named valve.

3. A shock absorber comprising a casing, a cylinder disposed in said casing, a piston mounted in said cylinder, a port formed in said cylinder and adapted to admit fluid thereto, an inwardly opening valve seated on said port, means for seating said valve, and an outwardly opening valve carried by said first named valve.

4. A shock absorber comprising a casing, a cylinder disposed in said casing, a piston mounted in said cylinder, a port in said cylinder adapted to admit fluid thereto, a valve member seating on said port and having an opening therethrough from said casing to said cylinder, and a valve carried by said valve member, normally closing said opening, and means for closing said valve.

5. A shock absorber comprising a casing, a cylinder disposed in said casing, a piston in said cylinder, a port in said cylinder and adapted to admit fluid thereto, a valve member seating on said port and having an opening therethrough from said casing to said cylinder, a valve carried by said valve member normally closing said opening, and resilient means for closing said valves.

6. A shock absorber comprising a casing, a cylinder disposed in said casing, a piston mounted in said cylinder, a port in said cylinder adapted to admit fluid thereto, a valve member seating on said port and having opening therethrough from said casing to said cylinder, a valve carried by said valve member normally closing said opening and opening in a direction opposite to said valve member, and means for closing said valve.

7. A shock absorber comprising a casing, a cylinder disposed in said casing, a piston mounted in said cylinder, a port in said cylinder adapted to admit fluid thereto from said casing, a valve seating on said port, means for seating said valve, and a second valve carried by said first named valve and adapted to permit the egress of fluid from said cylinder.

8. A shock absorber for cushioning the movement of two relatively movable members comprising a casing adapted to be secured to one of said members, a rock shaft having an arm adapted to be secured to the other of said members, a cylinder carried by said casing, a piston mounted in said cylinder, resilient means tending to force said piston in one direction, and means carried by said rock shaft normally resisting the actuating force of said resilient means and retaining said piston in a position to compress said means.

9. A shock absorber comprising a casing, a cylinder formed therein, a piston carried by said cylinder, means independent of the piston for establishing a free flow of fluid from said casing to said cylinder, and means carried by said last named means for restricting the flow of fluid from said cylinder.

10. A shock absorber comprising a casing, a cylinder carried thereby, a piston carried by said cylinder, means independent of the piston for establishing a free flow of fluid from said casing to said cylinder, and a resiliently controlled member carried by said last named means for restricting the flow of fluid from said cylinder to said casing.

11. A shock absorber comprising a casing adapted to be secured to one of two relatively movable elements, a member adapted to be secured to the other of said relatively movable members, and means including a piston and cylinder carried by said casing for resisting the relative movement between said relatively movable members in a plurality of directions.

12. A shock absorber comprising a casing adapted to be secured to one of two relatively movable elements, a member adapted to be secured to the other of said movable elements, and hydraulic means carried by said casing for resisting the movement of said elements from extreme positions of separation to an initial position of adjustment.

13. A shock absorber comprising a casing, a cylinder mounted therein, a piston mounted in said cylinder, a port in said cylinder for admitting fluid, a valve member for closing said port, an opening in said valve member, a spindle extending through said opening and having an opening therein, a valve carried by said spindle and adapted to close the opening in said valve member, and resilient means for closing said valve member and said valve.

14. A shock absorber including a cylinder, a piston mounted in said cylinder, said cylinder having an inlet opening, a valve mounted in said piston and adapted to close said inlet opening, said valve having an opening therein, and a second valve carried by said first named valve and adapted to close the opening therein.

15. In a shock absorber, a cylinder, a piston reciprocably mounted therein, said cylinder having an inlet port disposed below said piston, resilient means for forcing said piston in one direction, a valve closing the inlet port in said cylinder and having an opening therethrough, a spindle mounted in the opening in said valve and having a valve formed thereon adapted to close said opening, and means carried by said spindle and engaging said first named valve for closing the valve carried by said piston.

16. In a shock absorber, a cylinder, a piston mounted therein, said cylinder having a wall provided with an inlet port, a valve seated on said inlet port and having an opening therethrough, and a spindle mounted in said opening having relatively large opening communicating with the interior of said piston and cylinder, and having restricted openings leading from said relatively large opening to the exterior of said cylinder.

17. In a shock absorber, a member having a fluid containing chamber, a cylinder mounted in said chamber and having a port opening thereinto, a piston mounted in said cylinder, a valve seated on the port of said cylinder, a spindle carried by said valve, and resilient means engaging said cylinder and spindle and adapted to seat said valve, said spindle having means permitting the gradual egress of fluid from said cylinder.

18. In a shock absorber, a member having a fluid containing chamber, a cylinder mounted therein, a piston mounted in said cylinder, said cylinder having a wall provided with an inlet port, a valve seating on said port, and relief valve carried by said last named valve.

19. In combination with the frame and axle of a motor vehicle, a shock absorber comprising a retarding member secured to one of said vehicle elements, a lever, and operative connections between said lever and the other vehicle element and between said lever and said retarding member, said connections permitting substantially free movement of the axle in either direction from its intermediate position but retarding the return movement of said axle from either extreme position to its intermediate position.

20. In combination with the frame and axle of a motor vehicle, a shock absorber comprising a retarding member carried by the vehicle frame, a lever mounted on said frame, operative connections between said lever and the vehicle axle and between said lever and the retarding member, said shock absorber operating to permit substantially free movement of the axle in either direction away from its normal position but retarding the return movement of said axle from either extreme position to the normal position.

21. In combination with the frame and axle of a motor vehicle, a shock absorber comprising a retarding member carried by the vehicle frame, a lever pivoted on said frame and normally disposed in a horizontal plane, and operative connections between said lever and said retarding member and between said lever and said vehicle axle.

22. In combination with the frame and axle of a motor vehicle, a shock absorber comprising a retarding member carried by the vehicle frame, a lever pivoted on said frame and normally disposed in a horizontal plane, operative connections between one end of said lever and said retarding member and between the opposite end of said lever and said vehicle axle.

23. In combination with the frame and axle of a motor vehicle, a snubber mounted on said frame, a lever pivoted on said frame, and operative connections between said lever and said snubber, and between said lever and said axle.

24. In combination with a vehicle frame and axle, a snubber mounted on said frame, a horizontally disposed lever pivotally connected with said frame, and operative connections between one end of said lever and said snubber and between the other end of said lever and said axle.

In testimony whereof I affix my signature.

EARL G. GUNN.